Patented Nov. 7, 1922.                                                      1,434,693

UNITED STATES PATENT OFFICE.

JAMES HYNDES GILLIES, OF EAST CAMBERWELL, VICTORIA, AND PERCY McPHERSON GILLIES, OF ELECTRONA, NORTH WEST BAY, TASMANIA, AUSTRALIA.

TREATMENT OF ZINCIFEROUS ORES OR CONCENTRATES.

No Drawing.              Application filed January 28, 1919.   Serial No. 273,684.

*To all whom it may concern:*

Be it known that we, JAMES HYNDES GILLIES, of "Craigie-Var," Mont Albert Road, East Camberwell, in the State of Victoria, Commonwealth of Australia, mining engineer, and subject of the King of Great Britain, and PERCY McPHERSON GILLIES, of Electrona, North West Bay, in the State of Tasmania, Commonwealth of Australia, mining engineer, and subject of the King of Great Britain, have invented new and useful Improvements in and Connected with the Treatment of Zinciferous Ores or Concentrates; and we do hereby declare the following to be a full, clear, and exact description of the same.

This invention relates to the treatment of zinciferous ores and zinc concentrates and particularly to those ores containing zinc and other metals which are found on the west coast of Tasmania and in other parts of the world.

These complex ores contain zinc, lead and other metals in association, and may be treated as crude ore direct from the mine, or we may purchase and treat the materials after being crushed and roasted.

Hitherto, ores of this class have been submitted to a leaching process in which the materials are finely crushed, calcined and then treated with an acidified solution to dissolve the zinc content, the solution thus obtained being electrolyzed to recover the zinc. It has been found difficult by this means to obtain the zinc in the roasted material in a condition readily soluble in sulphuric acid and without fouling the solution with the iron, copper, manganese, as well as the arsenical and other contents which may be present in the ore.

According to our invention we utilize a process made up of a combination of metallurgical operations, some of which are more or less well known, but not hitherto known and used, in combination, for the purposes of our invention.

We provide by our process, which includes dry and wet methods of extraction, certain improvements wherein the preliminary very fine crushing and dead roasting are avoided and wherein the zinc is obtained as a fume in a condition readily soluble in acid and free from iron, copper, manganese and the like but containing other volatile substances. The solution obtained is then purified to remove the arsenical and like impurities and is treated in electrolytic cells for the recovery of metallic zinc.

In carrying our process into effect, the ore is crushed to pass through say, a 20 (more or less according to the nature of the ore) mesh screen and is desulphurized by roasting. With ores yielding in the crushing operation an excessive amount of fines, it is advisable to separate the fines from the crushed ore and to submit them to a sulphatizing roast and subsequent agglomeration with the main bulk of the crushed and roasted ore.

Sufficient sulphur should be left in the ore to provide for replacements of $SO_4$ radicle that may be used or lost during subsequent working operations.

In the treatment of concentrates containing zinc, lead and other sulphides, these may be roasted at the mine and delivered at a convenient place for treatment by our process, with or without further roasting, but such further treatment will, it must be understood, depend upon the class of concentrate to be treated and its sulphur content.

The roasted material is damped and thoroughly mixed and agglomerated with a proportion of crushed carbonaceous material, such as coke or coal, and is fed into a fuming furnace of the type having a perforated grate through which a low pressure air blast is passed. Or the material may be fumed without damping or agglomeration, in a reverberatory furnace after being mixed with the coke or coal. Preferably, the reverberatory furnace is only used when the lead contents of the ore are negligible.

The zinc and lead contents will thus be volatilized and drawn off as fume consisting mainly of zinc oxide and lead sulphate, which is collected in a baghouse or other fume collecting apparatus.

The sintered mass remaining in the furnace and known as clinker, will contain the gold, silver and copper values as well as any zinc not volatilized. This is withdrawn from the furnace and smelted in a suitable manner with the requisite fluxes to obtain the copper, silver and gold in the form of a matte and to volatilize any zinc and lead that may have escaped the fuming operation, such volatilized fume being collected in the main baghouse system.

In the treatment of the complex zinciferous ores of Tasmania, which may contain zinc, lead, copper, arsenic, antimony, cadmium and gold and silver values, the collected fume consists mainly of zinc oxide and lead sulphate, with small quantities of arsenic and other volatile metallic compounds which, in the subsequent electrolytic treatment for the recovery of the zinc, act detrimentally to the efficient working of the process and are therefore removed in the manner hereinafter explained.

Having obtained the fumed zinc and lead compounds together with the accompanying impurities such as arsenic, antimony and cadmium we treat the same with an acidified electrolyte (as $H_2SO_4$) which comes from the electrolytic section at a temperature of about 40 degrees centigrade, to dissolve the zinc oxide. A suitable strength of acid is 10%. The temperature will be further raised during this operation owing to the exothermic nature of the dissolving reaction; the amount of free acid remaining after treatment will be from fifteen (15) to twenty (20) grammes per litre of solution. The latter is now allowed to stand to permit the lead sulphate to settle out and when this has been effected the lead is collected and the clear zinc solution decanted.

This slightly acid solution containing the zinc sulphate together with the sulphates of volatile metals such as arsenic, antimony, and cadmium is heated, preferably to about 80 degrees centigrade, and is agitated by means of suitable apparatus with pulverized barium sulphide added to convert the sulphates of the said volatile metals to sulphides according to the typical reaction, namely—

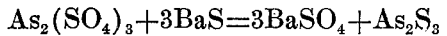

$$As_2(SO_4)_3 + 3BaS = 3BaSO_4 + As_2S_3$$

The barium sulphide can be readily prepared by reducing the sulphate, barytes, in the presence of carbon and applied heat.

The reaction is rapid under the conditions stated and the solution can now be clarified by allowing the mixture of insoluble barium sulphate and the insoluble precipitated sulphides to settle. The settling is also rapid and complete when barium sulphide is used, owing to its high specific gravity, the barium sulphate formed effectually carrying down with it the precipitated sulphides. After decanting the clear liquor the sludge is filtered or centrifuged.

The purified zinc sulphate solution is now passed through the electrolytic cells in which the zinc is deposited and a corresponding amount of $H_2SO_4$ is liberated as free acid, which reacidified solution is used again to dissolve fresh batches of fume, and so on cyclically.

For cathodes we use zinc plates and we have found that a current density of 25 to 30 amps. per square foot of cathodes surface yields good results.

To ensure an even deposition of zinc, it is advantageous to use in the cells a colloidal addition agent such as gum arabic. We have found that if from one half ($\frac{1}{2}$) to one (1) gramme of the addition agent be added per litre of solution, satisfactory results are obtained.

In the recovery of metallic zinc by electrolysis it is of prime importance to obtain a zinc sulphate solution as nearly free from arsenical and such like impurities as possible. From an impure solution the impurities are deposited with the zinc and electrolysis is retarded, if not entirely suspended, when the solution becomes about 3 per cent acid. But if the impurities are, as herein explained, eliminated or almost so, before electrolysis, the latter will proceed efficiently until the solution approaches to 100 to 120 grammes per litre free sulphuric acid. This acid solution is then pumped to a dissolver where it meets with and is almost neutralized by a supply of fresh fume.

By depositing zinc until the solution becomes strongly acid the need for removing the acidified solution is less frequent, with consequent savings in working costs. Thus, apart from the great advantage of obtaining a pure or almost pure zinc deposit, we have in our process a longer continuity of electrolytic action and a resulting larger quantity of free acid with which to treat fresh fume.

Having now described our invention, what we claim as new and desire to secure by Letters Patent is:—

1. The process of treating zinciferous ores or concentrates of the same for the recovery of zinc by electrolysis which consists in fuming the crushed and roasted ores, collecting the fume, treating the fumed zinc oxide and lead sulphate with sulphuric acid solution to dissolve the zinc oxide, separating out the insoluble lead sulphate, purifying the zinc sulphate solution with barium sulphide to precipitate the arsenical and like impurities and electrolyzing the purified zinc solution, as specified.

2. The treatment of zinciferous ores or concentrates of the same for the recovery of zinc by electrolysis, in which a solution of zinc sulphate is purified, prior to electrolysis, by the addition of barium sulphide to precipitate its arsenical and such like impurities, as herein set forth.

3. The treatment of zinciferous ores or concentrates of the same for the recovery of zinc by electrolysis, in which a solution of zinc sulphate is heated to about 80 degrees centigrade and purified, prior to electrolysis, by the addition of barium sulphide to precipitate the arsenical and such like impurities, as set forth.

4. In the treatment of zinciferous ores or concentrates of the same, fuming the zinc and lead from the crushed and roasted ores in a furnace, retreating the clinker with fluxes to recover the precious metals and copper and to fume off any remaining zinc, treating the zinc and lead fume with sulphuric acid solution to dissolve the zinc oxide, separating out the insoluble lead sulphate, treating the resulting zinc sulphate solution with barium sulphide and electrolyzing the purified solution, as and for the purposes herein set forth.

5. In the treatment of zinciferous ores of the kind indicated, the process wherein the core is coarsely crushed and partially desulphurized, the fines collected and separately subjected to a sulphatizing roast and mixed with the ore and carbonaceous material and agglomerated, fuming the mixture in a furnace, retreating the furnace clinker to recover precious metals and copper, treating the zinc and lead fume with sulphuric acid solution, separating out the insoluble lead sulphate, purifying the zinc sulphate solution with the addition thereto of barium sulphide and electrolyzing such purified solution, as herein specified.

6. In the treatment of zinciferous ores of the kind indicated, the process wherein the ore is coarsely crushed and partially desulphurized, the fines collected and separately subjected to a sulphatizing roast and mixed with the ore and carbonaceous material and agglomerated, fuming the mixture in a furnace, retreating the furnace clinker to recover precious metals and copper, treating the zinc and lead fume with sulphuric acid solution, separating out the insoluble lead sulphate, purifying the zinc sulphate solution, after heating same to about 80 degrees centigrade, with the addition thereto of barium sulphide and electrolyzing the purified solution, substantially as hereinbefore described.

In testimony whereof, we have signed our names to this specification in the presence of two subscribing witnesses.

JAMES HYNDES GILLIES.
PERCY McPHERSON GILLIES.

Witnesses:
WILFRID H. HANPETTS,
H. L. BUTLER.